UNITED STATES PATENT OFFICE.

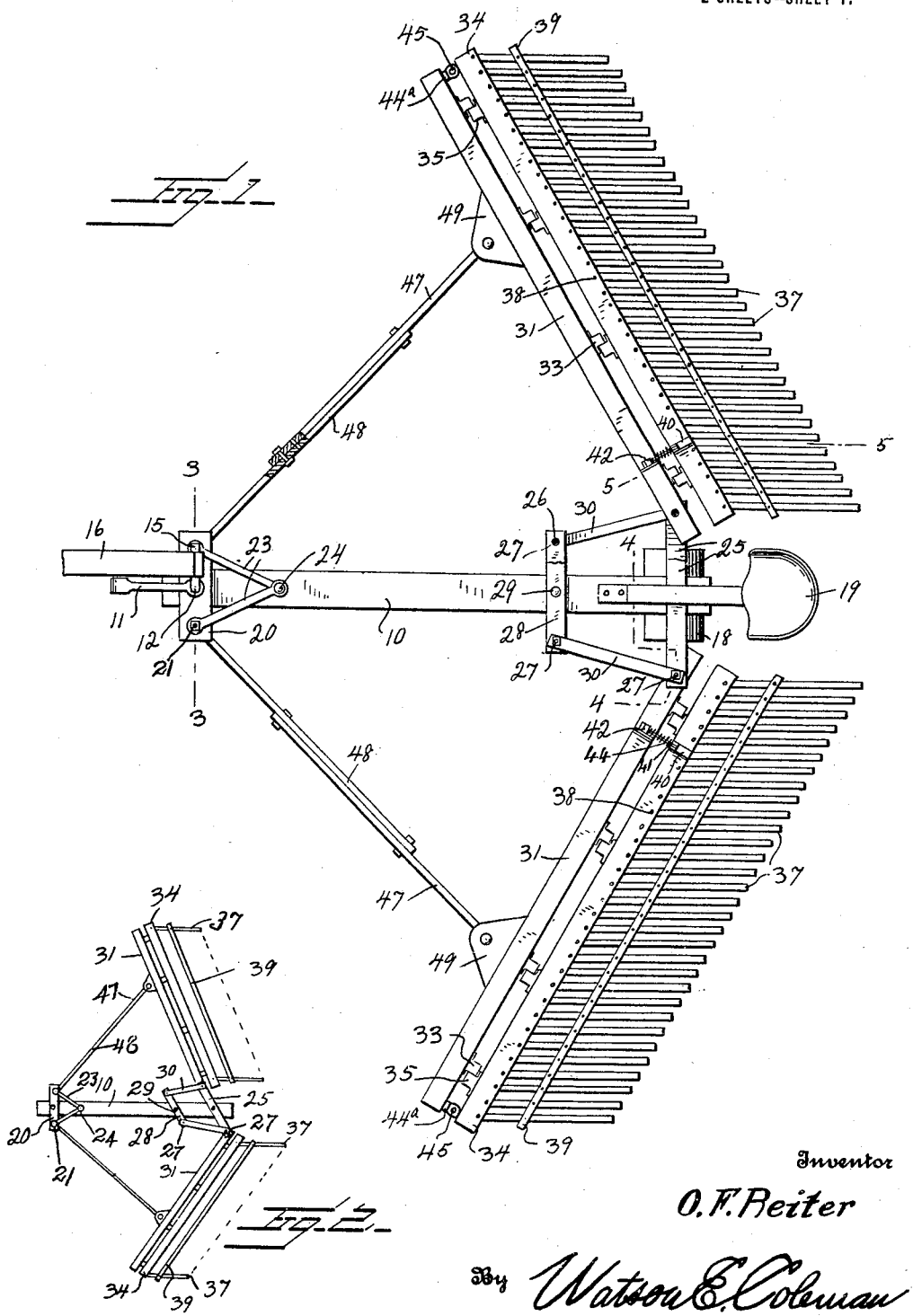

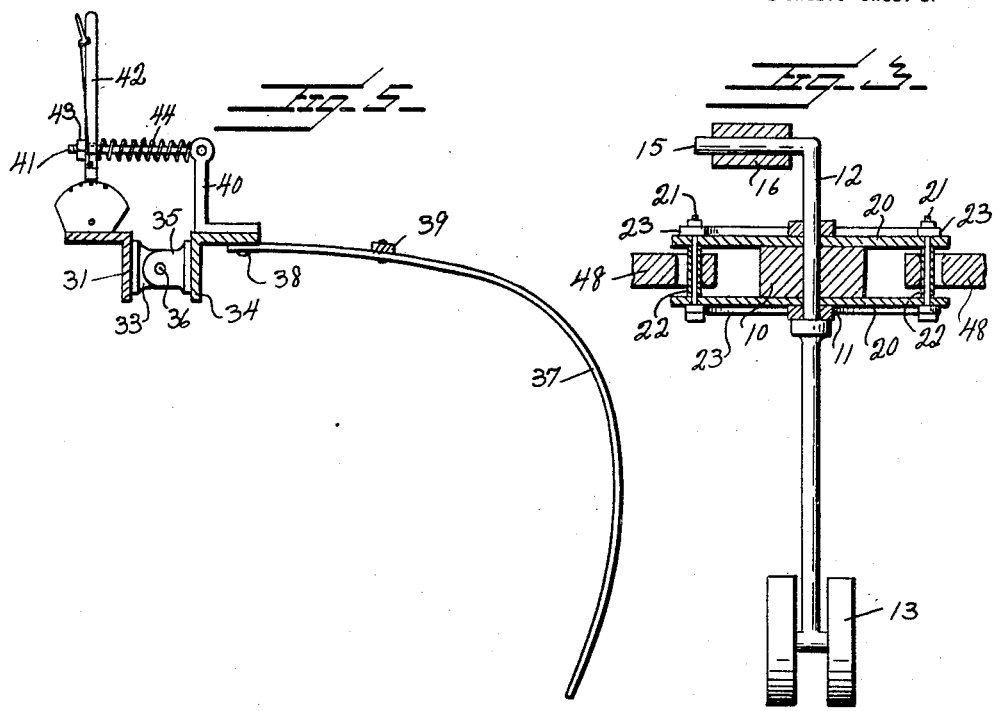

OTIS FRANKLIN REITER, OF BALTIMORE, MARYLAND.

STONE-RAKE.

1,325,580.  Specification of Letters Patent.  Patented Dec. 23, 1919.

Application filed December 24, 1918. Serial No. 268,139.

*To all whom it may concern:*

Be it known that I, OTIS F. REITER, a citizen of the United States, residing at Baltimore, State of Maryland, have invented certain new and useful Improvements in Stone-Rakes, of which the following is a specification, reference being had to the accompanying drawings.

This invention relates to raking machines, and particularly to stone gatherers in the nature of rakes.

The general object of the invention is to provide a very simple, relatively light, and cheaply constructed stone rake, so made that stones in the path of the rake or rakes will be shifted laterally and delivered at the side of the rake, preferably behind the line of draft.

A further object is to provide a construction of this kind with two rakes disposed laterally of the line of draft and delivering toward each other.

A further object, and a very important one, is to provide a construction of this character in which the rake may be adjusted at less than a right angle to the line of draft, and to provide means whereby the angle of each rake may further be automatically adjusted within certain limits by the load on each rake and in this connection to provide a mechanism whereby if the load be that for which the rakes are adjusted, the rake will remain at a constant angle but that if the load be increased as by the engagement of a rake with larger stones, the inner end of the rake will be shifted rearward and the angle of the rake to the line of draft be decreased or rendered more acute so as to facilitate the lateral discharge of the stones.

A further object is to provide an evener bar construction for supporting the inner ends of both rakes whereby the rearward movement of one rake will cause the forward movement of the other rake thereby evening the draft.

A further object is to provide means whereby the angle of the rake heads may be initially adjusted by hand and also to provide means for mounting the rake teeth and for raising or lowering the rake.

Still another object is to provide a construction of this kind with a forward truck and a rear truck, and provide the ends of the rake carrying bars with caster wheels.

Another object is to provide means whereby the rake teeth may rise where a large stone is encountered which would ordinarily break the rake teeth.

A further object is to provide means whereby the rake teeth shall always extend parallel to the line of draft without regard to the position of the rake heads or bars, and whereby the angle of the rake heads or bars may be adjusted to thereby adjust the distance between the points of adjacent rake teeth in the line of draft.

Other objects will appear in the course of the following description.

My invention is illustrated in the accompanying drawings, wherein:—

Figure 1 is a top plan view of my stone rake;

Fig. 2 is a like view to Fig. 1 showing the manner in which the rakes will swing to even the draft;

Fig. 3 is a section on the line 3—3 of Fig. 1;

Fig. 4 is a transverse section on the line 4—4 of Fig. 1;

Fig. 5 is a section on the line 5—5 of Fig. 1;

Fig. 6 is a fragmentary section of the extremity of one of the rakes showing the supporting means therefor; and Fig. 7 is a sectional view of a rake supporting bar 31 showing the connection of the rod 47 thereto.

Referring to the drawings, 10 designates a draft beam, having at its forward end a clevis 11. Extending downward through the clevis 11 and the forward end of the draft beam is a shaft 12 carrying at its lower end a pair of relatively small supporting wheels 13. This shaft 12 is preferably provided with a radially projecting arm 15, whereby if desired a steering tongue 16 may be engaged with the shaft 12. Under ordinary circumstances, however, the draft animals or tractor will be connected directly to the clevis 11. The rear end of the beam 10 is provided with any suitable depending support 17 upon which are mounted the relatively wide supporting wheels 18. A seat 19 may also be mounted upon the rear end of the beam.

Extending across the forward end of the beam 10 are a pair of bars 20 through which the shaft or king bolt 12 passes and through the extremities of these bars pass the bolts or pins 21 which extend through sleeves 22 between the bars. Braces 23 extend from these pins or bolts 21 to the tongue and are engaged therewith by means of a vertical bolt 24. Pivotally mounted upon the rear end of the beam 10 are the transverse bars 25 which extend equidistantly on each side of the beam, there being one of these bars above and one below the beam. These bars are spaced from each other at their ends by spacing sleeves 26 and are engaged with each other by bolts 27. Mounted above and below the beam 10, forward of the bars 25, are the bars 28 which are shorter than the bars 25 and are pivoted to the beam by the bolt 29 and are also spaced from each other by sleeves 26 and engaged with each other by bolts 27. Links 30 connect the extremities of the bars 25 with the extremities of the bars 28, the bolts 27 pivotally connecting the links to the bars 25 and 28.

There are two sets of rake teeth, one on each side of the beam 10 and as both sets are constructed alike I will only describe one of these rakes. Pivotally connected to the sleeve 26 of the bar 25 in the manner illustrated in Fig. 4, is an angle iron 31, the vertical flange of which is cut away at the inner end of the angle iron so as to leave the horizontal flange projecting beyond the vertical flange and this horizontal flange is formed with an enlarged opening 32 through which the sleeve 26 passes. Thus the angle iron rides loosely on the sleeve 26 and may move vertically or swing or pivot thereon.

The angle iron 31 carries upon its vertical flanges a plurality of hinge members 33 and coacting with and extending parallel to the angle iron 31 is an angle iron 34, the vertical web of which is also provided with hinge members 35 coacting with the hinge members 33 and connected thereto by a pintle 36. A plurality of rake teeth 37 are pivoted to the horizontal web or flange of the angle iron 34 by pins 38, these rake teeth being uniformly spaced along the angle iron 34 and extending rearward therefrom. All of the rake teeth are pivoted to a rod 39 so that the rake teeth move together. The rake teeth may be raised and lowered by providing the angle iron 34 with an upwardly extending arm 40 from which a bolt 41 extends to a lever 42 mounted in any suitable manner upon the angle iron 31, this bolt 41 passing loosely through the lever 42 and being provided with a nut 43 and with a compression spring 44 disposed between the arm 40 and the lever 42. Inasmuch as the rake teeth 37 are pivoted to the angle iron 34 and are connected to each other by a longitudinally extending rod 39, which is pivoted to each of the rake teeth, it follows that these rake teeth will always extend parallel to the line of draft without regard to the angular position of the rake heads or bars relative to the beam 10, and it will be obvious that the more acute the angle of the bars 31 and 34 relative to the beam 10, the greater will be the distance between the points of the rake teeth.

Now when the lever 42 is shifted in one direction, the angle iron 34 will be tilted to lift the rake but if the rake teeth strike a stone or other obstruction too deeply embedded in the ground to be drawn forward by the rake teeth, the rake will rise, the angle iron 34 rotating upon the pintles 36, and the bolt 41 moving through the lever 42 against the compression of the spring 44 which will cause the rake teeth to drop as soon as the obstacle has been passed. I do not wish to limit myself to the use of a spring 44 as the weight of the rake teeth will ordinarily be sufficient to bring the rake back to its normal position.

Preferably, however, I use the spring 44 as this will act to hold the rake teeth down in proper position and will only yield when a large boulder or like obstruction is encountered. Each rake at its outer end is supported by means of a caster wheel and to this end a leg 44ª may be attached to the vertical flange of the angle iron 31, the leg being angled at its lower end and having the pintle 45 of the caster wheel 46 extending through this angled portion in the usual manner. The caster wheel is, of course, freely rotatable as the machine is drawn over the ground.

The free end of each rake is connected to the forward end of the beam 10 by means of a pair of relatively adjustable rods 47 and 48, the rod 47 being pivotally connected to a pair of ears 49 extending out from the angle iron 31 and the rod 48 being loosely engaged with the sleeve 22 on that side of the bar 10, the opening for the passage of this sleeve through the rod 48 being relatively large to permit the rod 48 to slip up and down on the sleeve and rotate or swing thereon. The rods 47 and 48 are adjustable upon each other so as to increase or decrease the distance between the forward end of the rake and the forward end of the beam 10 and thus increase or decrease the angle of the rake relative to the line of draft.

In the operation of this device, the rakes are adjusted at an angle depending upon the size of the stones to be gathered, in other words, upon the average load to which the rake will be subjected. As the beam 10 moves forward the rakes will float and will move in conformity with the contour of the ground and the rake teeth will gather up the loose stones. Inasmuch as the rake teeth are disposed with their rear ends in a line at an acute angle to the line of draft, the stones will move laterally toward the line of draft and will be discharged at the inner ends of the rakes. In other words, these rakes are side delivery rakes. Now in case the load on one of the rakes is increased beyond a predetermined extent, the over-loaded rake will move rearward and inward (see Fig. 2), the evener bars 25 and 28 swinging to this end and the other rake will move forward. The rearward movement of one of the rakes therefore will materially decrease its angle relative to the line of draft while the angle of the other rake will be increased. The decrease in angle of the first rake will cause the more rapid delivery of the stones and thus act to relieve the load on that rake and then as the loads are more evenly balanced the rakes will swing back to their original position.

Furthermore, the decreasing of the angle of a rake will shift the ends of the rake teeth relative to each other so that the step between any two rake teeth will be increased, thus permitting the escape of larger stones and hence decreasing the load. The initial angle of the rakes may be adjusted by adjusting the bars 47 and 48 and this adjustment of the bars 47 and 48 will adjust the space or the length of the "step" between two adjacent rake teeth and thus tend to regulate the size of stones which will be gathered by the rake.

When the rakes are disposed at a relatively great angle with relation to the beam 10 or line of draft, the rake teeth at their extremities will be relatively close together and hence relatively small stones will be gathered. In this case there is no necessity for a very high pitch being given to the rake as the load will be relatively light but if it is desired to gather stones of a heavier weight then the pitch of the rake is increased. This increases the distance between the teeth of the rake at their ground engaging ends and allows the smaller stones to slip out between the tines or teeth and inasmuch as the pitch of the rake is increased, the side delivery of the rake will be more rapid and the load on the rake itself will be reduced.

By this machine the stones will be gathered from the field and discharged in a row across the field. What is true of the action of the rakes would likewise be true with any other scraping element mounted upon the beams 34 and hence I do not wish to be limited to the use of rake teeth as scraping elements.

While I have illustrated a construction which I believe to be very effective and extremely simple, yet it is obvious that many modifications might be made in minor details without departing from the spirit of the invention. The device is cheap, may be operated by either a tractor or draft animals and not only may be used for gathering stones but may be used for harrowing or like cultivation. The rake teeth travel or float over the ground, being supported from digging into the ground by the caster wheels 46 and inasmuch as the rakes are flexibly connected to the beam 10, it is obvious that they will conform to the contour of the ground.

I claim:—

1. A machine of the character described including a draft beam, and a scraping element disposed at an angle to the line of draft, and means swingingly connecting the scraping element to the beam and permitting the scraping element to automatically swing into a decreased angular relation to the line of draft under a heavier load and automatically swing to a position increasing said angle when the load is lighter.

2. A machine of the character described including a draft beam, oppositely disposed scraping elements, one on each side of the draft beam, and evener bars pivoted to the draft beam and to the scraping elements, and links swingingly connecting the outer ends of the scraping elements to the forward end of the draft beam.

3. A machine of the character described including a draft beam and a scraping element disposed at an angle to the line of draft, means swingingly connecting the outer end of the element to the beam, and a member pivoted to the beam and to the inner end of the scraping element and yieldingly held at a predetermined angle with relation to the line of draft.

4. A machine of the character described including a draft beam, a scraping element disposed on each side of the draft beam and extending outward and forward with relation thereto, a transversely extending bar pivoted to the draft beam and pivoted at its ends to the inner ends of the scraping elements, and means connecting the outer ends of the scraping elements to the beam and permitting the swinging of said scraping elements.

5. A machine of the character described including a draft beam, a scraping element disposed on each side of the draft beam and extending outward and forward with relation thereto, a transversely extending bar pivoted to the draft beam and pivoted at its ends to the inner ends of the scraping elements, and means connecting the outer ends of the scraping elements to the beam and permitting the swinging of said scraping elements, said means being adjustable as to length to thereby increase or decrease the normal angle of the scraping elements relative to the beam.

6. A machine of the character described including a draft beam, a scraping element disposed on each side of the draft beam and extending outward and forward with relation thereto, a transversely extending bar pivoted to the draft beam and pivoted at its ends to the inner ends of the scraping elements, and links adjustably connected to each other for longitudinal adjustment and pivotally connected to the scraping element and to the forward end of the draft beam.

7. A machine of the character described including a draft beam, supporting bars disposed on each side of the draft beam and normally extending outward and forward with relation thereto, a transversely extending bar pivoted to the draft beam and pivoted at its ends to the inner ends of said supporting bars, means adjustably connecting the outer ends of the supporting bars to the draft beam, whereby the supporting bars may be shifted to different angles, and rake teeth operatively pivoted to said supporting bars for free swinging movement in a horizontal plane.

In testimony whereof I hereunto affix my signature in the presence of two witnesses.

OTIS FRANKLIN REITER.

Witnesses:
  H. W. WAGGONER,
  WM. F. WEIDMAN.